United States Patent
Puckett

(10) Patent No.: US 7,291,390 B2
(45) Date of Patent: Nov. 6, 2007

(54) SIZING COMPOSITION FOR GLASS FIBERS AND SIZED FIBER GLASS PRODUCTS

(75) Inventor: Garry D. Puckett, Salisbury, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/704,010

(22) Filed: Nov. 7, 2003

(65) Prior Publication Data

US 2005/0100734 A1    May 12, 2005

(51) Int. Cl.
*D02G 3/00*    (2006.01)
*B32B 9/00*    (2006.01)

(52) U.S. Cl. ............... 428/378; 428/375; 428/391; 428/392

(58) Field of Classification Search ............... 428/372, 428/375, 378, 391, 392; 8/115.6; 106/8.81, 106/8.83
See application file for complete search history.

(56) References Cited

U.S. PATENT DOCUMENTS

| 2,723,215 | A | | 11/1955 | Biefeld et al. |
| 3,997,306 | A | | 12/1976 | Hedden |
| 4,049,597 | A | | 9/1977 | Motsinger |
| 4,110,094 | A | | 8/1978 | Motsinger |
| 4,305,742 | A | | 12/1981 | Barch et al. |
| 4,536,447 | A | * | 8/1985 | Hsu ............... 428/392 |
| 4,637,956 | A | | 1/1987 | Das et al. |
| 4,808,478 | A | | 2/1989 | Dana et al. |
| 4,810,576 | A | | 3/1989 | Gaa et al. |
| 5,242,958 | A | | 9/1993 | Klett et al. |
| 5,248,562 | A | | 9/1993 | Palermo et al. |
| 5,466,528 | A | | 11/1995 | Girgis |
| 5,552,519 | A | | 9/1996 | Hemmings et al. |
| 5,670,255 | A | | 9/1997 | Temple et al. |
| 5,747,162 | A | | 5/1998 | Temple et al. |
| 5,804,313 | A | | 9/1998 | Schell |
| 5,824,413 | A | | 10/1998 | Schell |
| 5,872,067 | A | | 2/1999 | Meng et al. |
| 5,883,021 | A | | 3/1999 | Beer et al. |
| 5,883,023 | A | | 3/1999 | Martine et al. |

(Continued)

FOREIGN PATENT DOCUMENTS

EP    1 457 466 A2    9/2004

OTHER PUBLICATIONS

Akzo Nobel—Eka Chemicals, Inc., Material Safety Data Sheet for Dynakoll Si 100, available at http://www.ekamsds.com, pp. 1-5.

(Continued)

*Primary Examiner*—Jill Gray
(74) *Attorney, Agent, or Firm*—Dennis G. Millman

(57) ABSTRACT

An aqueous sizing composition for at least partially coating a plurality of glass fibers can comprise at least one rosin, at least one coupling agent, and at least one lubricant. The rosin can be a chemically-modified rosin. A plurality of coupling agents can be included, including combinations of coupling agents that can provide for multi-resin compatibility and desirable fiber glass strand properties. An embodiment of a fiber glass strand at least partially coated with a sizing composition may have properties particularly suited for applications that do not utilize air jet weaving.

50 Claims, 8 Drawing Sheets

U.S. PATENT DOCUMENTS

| | | |
|---|---|---|
| 5,908,689 A | 6/1999 | Dana et al. |
| 5,910,458 A | 6/1999 | Beer et al. |
| 6,042,035 A | 3/2000 | Grobler et al. |
| 6,228,496 B1 | 5/2001 | Lawton et al. |
| 6,283,164 B1 | 9/2001 | Parks |
| 6,372,842 B1* | 4/2002 | Grisso et al. ............... 524/547 |
| 6,564,437 B2 | 5/2003 | Meng et al. |
| 6,593,255 B1 | 7/2003 | Lawton et al. |
| 2002/0051882 A1* | 5/2002 | Lawton et al. ............. 428/378 |
| 2002/0055313 A1* | 5/2002 | Velpari et al. ............. 442/180 |
| 2002/0058140 A1* | 5/2002 | Dana et al. ................ 428/375 |
| 2002/0058449 A1* | 5/2002 | Velpari et al. ............... 442/59 |
| 2002/0085888 A1* | 7/2002 | Velpari et al. .............. 408/1 R |
| 2002/0086598 A1* | 7/2002 | Velpari et al. ................ 442/74 |
| 2002/0123285 A1* | 9/2002 | Dana et al. ................ 442/237 |
| 2002/0193027 A1* | 12/2002 | Dana et al. ................ 442/285 |

OTHER PUBLICATIONS

Loewenstein, K., *The Manufacturing Technology of Glass Fibres*, (3d Ed. 1993) at pp. 30-44, 47-60, 115-122 and 126-135.

Database WPI, Section Ch, Week 197940, Derwent Publications Ltd., London, GB; Class A17, AN 1979 -72365B XP002321642 & JP 54 106627 A (Asahi Glass Co. Ltd) Aug. 21, 1979 abstract.

* cited by examiner

SIZING COMPOSITION FOR GLASS FIBERS AND SIZED FIBER GLASS PRODUCTS

FIELD OF THE INVENTION

The present invention relates to sizing compositions for glass fibers and to fiber glass strands comprising a plurality of glass fibers at least partially coated with a sizing compositon.

BACKGROUND OF THE INVENTION

Various chemical treatments exist for glass-type surfaces such as glass fibers to aid in their processability and applications. Before bundling the filaments together after formation, a coating composition or sizing composition is applied to at least a portion of the surface of the individual filaments to protect them from abrasion and to assist in processing. As used herein, the terms "sizing composition," "sizing," "binder composition," "binder," or "size" refer to a coating composition applied to the filaments immediately after forming. Sizing compositions may provide protection through subsequent processing steps, such as those where the fibers pass by contact points as in the winding of the fibers and strands onto a forming package, drying the aqueous-based or solvent-based sizing composition to remove the water or solvent, twisting from one package to a bobbin, beaming to place the yarn onto very large packages ordinarily used as the warp in a fabric, chopping in a wet or dry condition, roving into larger bundles or groups of strands, unwinding for use as a reinforcement, and other downstream processes.

In addition, sizing compositions can play a dual role when placed on fibers that reinforce polymeric matrices in the production of fiber-reinforced plastics. In such applications, the sizing composition provides protection and also can provide compatibility between the fiber and the matrix polymer or resin. For instance, glass fibers in the forms of both woven and nonwoven fabrics and mats and rovings and chopped strands have been used with resins, such as thermosetting and thermoplastic resins, for impregnation by, encapsulation by, or reinforcement of the resin. In such applications, it is desirable to maximize the compatibility between the surface and the polymeric resin while also improving the ease of processability and manufacturability. It would be desirable to provide a sizing composition for glass fibers that is compatible with a wide variety of thermosetting and thermoplastic resins and that can also be processed and manufactured well.

An example of a resin is a vinyl addition polymer like polyvinyl chloride (PVC). In selecting a sizing composition for use with PVC powders, plastisols, or organosols, fiber glass manufacturers have struggled with the PVC compatibility, coating performance, and weaving defects. Another problem area has been broken filaments. For example, broken filaments can accumulate in the creel guide-eyes and in the PVC plastisol itself, as well as in the coater dies. Excessive accumulation can result in a breakout and/or a loss of productivity. Thus, it would be desirable to provide a fiber glass product coated with a sizing composition that performs well and improves productivity by generating minimal broken filaments.

In the past, fiber glass strands coated with starch-oil based sizing compositions have been used in PVC coating applications. U.S. Pat. No. 5,466,528 provides an example of such a sizing composition. However, fiber glass products coated with such starch-oil based sizing compositions have experienced broken filament issues. It would be desirable to provide a sizing composition that performs well in PVC coating applications without significant performance issues.

Rosins have been previously disclosed as part of coating compositions for fiber strands. Some of these prior disclosures may not utilize rosins in amounts that would realize the desirable attributes that such rosins can provide when coated on fiber glass as part of a sizing composition. Such desirable attributes are discussed in more detail below in connection with the discussion of the present invention. Other disclosures utilize rosins as part of coating compositions that would not be suitable for the applications contemplated by the present invention due to properties of the fiber glass coated with such coating compositions.

It would be desirable to provide fiber glass strands coated with a sizing composition that are compatible with a wide variety of resins for encapsulation, impregnation, reinforcement, or coating, where the compatibility is good enough to be an improvement over that obtained with starch-oil type formulations and where the processability of the fiber glass strands before and after use with the resin results in a reduction in defects.

SUMMARY

In accordance with the present invention, there is provided an aqueous sizing composition for glass fibers. Also provided are fiber glass strands that can comprise at least one glass fiber at least partially coated with a sizing composition. Coated fiber strands of the present invention can be used in a wide variety of applications, such as screens, tapes, flooring products, aviation composite materials, aerospace composite materials, fabrics for marine applications, window shades, braided products, scrim fabrics, filters, and others.

Fiber glass strands coated with a sizing composition of the present invention can advantageously be compatible with a variety of different resins, including thermoplastic resins, thermosetting resins, and other resins. Embodiments of fiber glass strands coated with sizing compositions of the present invention can also exhibit desirable physical characteristics. Examples of such physical characteristics can include number of broken filaments, abrasion resistance, air drag, strand integrity, strand friction, and others. These physical characteristics can be particularly important depending on the end use application and the processing required to use fiber glass strands in such applications. Fiber glass strands having a low strand friction and good strand integrity may perform better in some applications than in others. For example, fiber glass strands have low strand friction and good strand integrity may not perform well in air jet weaving applications, in which there is a need for fiber glass strands used as fill yarns to "open up" to allow the air to push the strands through. Thus, embodiments of the present invention advantageously provide fiber glass strands at least partially coated with a sizing composition that are compatible with a plurality of different resins and that exhibit desirable physical characteristics.

In one embodiment, a fiber glass strand comprises at least one glass fiber at least partially coated with a sizing composition, the sizing composition comprising at least one rosin, at least one aminofunctional coupling agent, and at least one lubricant, wherein the fiber glass strand has a strand friction of about 90 grams or less. In a further embodiment, the fiber glass strand can have a strand friction of about 75 grams or less. In a further embodiment, the fiber glass strand can have a strand friction of about 65 grams or less.

An embodiment of an aqueous sizing composition of the present invention for at least partially coating glass fibers comprises at least one rosin; at least one aminofunctional coupling agent; and at least one lubricant, wherein the sizing composition is adapted to provide a fiber glass strand, at least partially coated with the sizing composition, with a strand friction of about 90 grams or less. In a further embodiment, the aqueous sizing composition can be adapted to provide a fiber glass strand, at least partially coated with the sizing composition, with a strand friction of about 75 grams or less. In a further embodiment, the aqueous sizing composition can be adapted to provide a fiber glass strand, at least partially coated with the sizing composition, with a strand friction of about 65 grams or less.

The at least one rosin can comprise at least one chemically-modified rosin. The chemically-modified rosin can comprise modified abietic acid in some embodiments. The at least one chemically-modified rosin, in non-limiting embodiments, can be dispersible in water to facilitate the use of the rosin in an aqueous sizing composition. The at least one rosin can comprise about 50 percent by weight or greater of the sizing composition on a total solids basis in some embodiments. In further embodiments of the present invention, the at least one rosin can comprise from about 60 to about 90 percent by weight of the sizing composition on a total solids basis. The at least one rosin, in a further embodiment, can comprise from about 75 to about 85 percent by weight of the sizing composition on a total solids basis.

The at least one aminofunctional coupling agent, in one embodiment, can comprise at least one aminopropyltrialkoxysilane. Embodiments of aqueous sizing compositions of the present invention can comprise a plurality of coupling agents. In one embodiment, an aqueous sizing composition can comprise an aminofuntional coupling agent and a second coupling agent, such as methacryloxypropyltrialkoxysilane or glycidoxypropyltrialkoxysilane. In another embodiment, the sizing composition can comprise at least three coupling agents, such as at least one aminopropyltrialkoxysilane, at least one methacryloxypropyltrialkoxysilane, and/or glycidoxypropyltrialkoxysilane. The amount and type of each coupling agent used in an aqueous sizing composition of the present invention may be selected based on resin compatibility, effect on fiber glass strand properties (e.g., lower broken filaments, abrasion resistance, strand integrity, and strand friction), and compatibility with other components of the sizing composition.

The at least one lubricant can comprise at least one cationic lubricant and/or at least one nonionic lubricant. In embodiments comprising at least one nonionic lubricant, the at least one nonionic lubricant can be a wax and/or an oil. An example of a wax suitable for embodiments of the present invention is polyethylene wax.

Non-limiting embodiments of the present invention can also comprise other components, such as, for example, biocides, antistatic agents, anti-foaming agents, wetting agents, and mixtures thereof.

The present invention also relates to a number of products that can be formed using fiber glass strands of the present invention, including for example, screens, tapes, flooring products, aerospace composites, aviation composites, filters, and others.

Another embodiment of an aqueous sizing composition of the present invention for at least partially coating glass fibers as part of a fiber glass strand comprises at least one rosin in an amount greater than about 50 weight percent on a total solids basis; a first coupling agent comprising at least one aminofunctional silane; a second coupling agent; and a cationic lubricant. The first coupling agent can be present, in some embodiments, in an amount up to about 10 weight percent on a total solids basis. The second coupling agent can be present, in some embodiments, in an amount up to about 10 weight percent on a total solids basis. In further embodiments, the aqueous sizing composition can further comprise a nonionic lubricant.

In another embodiment of the present invention, an aqueous sizing composition for at least partially coating glass fibers as part of a fiber glass strand comprises at least one rosin in an amount up to about 90 weight percent on a total solids basis; a first coupling agent in an amount up to about 5 weight percent on a total solids basis, the first coupling agent comprising at least one aminopropyltrialkoxysilane; a second coupling agent in an amount up to about 5 weight percent on a total solids basis, the second coupling agent comprising at least one glycidoxypropyltrialkoxysilane; a third coupling agent in an amount up to about 5 weight percent on a total solids basis, the third coupling agent comprising at least one methacyloxypropyltrialkoxysilanes; a cationic lubricant in an amount up to about 10 weight percent on a total solids basis; and a nonionic lubricant in an amount up to about 10 weight percent on a total solids basis.

Other embodiments of aqueous sizing compositions for glass fibers of the present invention comprise at least one rosin; at least one coupling agent; and at least one lubricant, wherein the sizing composition is adapted to at least partially coat glass fibers for non-air jet weaving applications.

Other embodiments of fiber glass strands of the present invention comprise at least one glass fiber at least partially coated with a sizing composition, the sizing composition comprising at least one rosin in an amount greater than about 50 weight percent on a total solids basis; a first coupling agent comprising at least one aminofunctional silane; a second coupling agent; and a cationic lubricant. The first coupling agent can be present, in some embodiments, in an amount up to about 10 weight percent on a total solids basis. The second coupling agent can be present, in some embodiments, in an amount up to about 10 weight percent on a total solids basis. In further embodiments, the sizing composition can further comprise a nonionic lubricant.

In another embodiment, a fiber glass strand can comprise at least one glass fiber at least partially coated with a sizing composition, the sizing composition comprising at least one rosin in an amount up to about 90 weight percent on a total solids basis; a first coupling agent in an amount up to about 5 weight percent on a total solids basis, the first coupling agent comprising at least one aminopropyltrialkoxysilane; a second coupling agent in an amount up to about 5 weight percent on a total solids basis, the second coupling agent comprising at least one glycidoxypropyltrialkoxysilane; a third coupling agent in an amount up to about 5 weight percent on a total solids basis, the third coupling agent comprising at least one methacyloxypropyltrialkoxysilane; a cationic lubricant in an amount up to about 10 weight percent on a total solids basis; and a nonionic lubricant in an amount up to about 10 weight percent on a total solids basis.

Other embodiments of fiber glass strands of the present invention comprise at least one glass fiber at least partially coated with a sizing composition, the sizing composition comprising at least one rosin; at least one coupling agent; and at least one lubricant wherein the fiber glass strand is adapted for non-air jet weaving applications.

These and other embodiments of the present invention are described in greater detail in the detailed description of the invention which follows.

DETAILED DESCRIPTION

Figure 1:
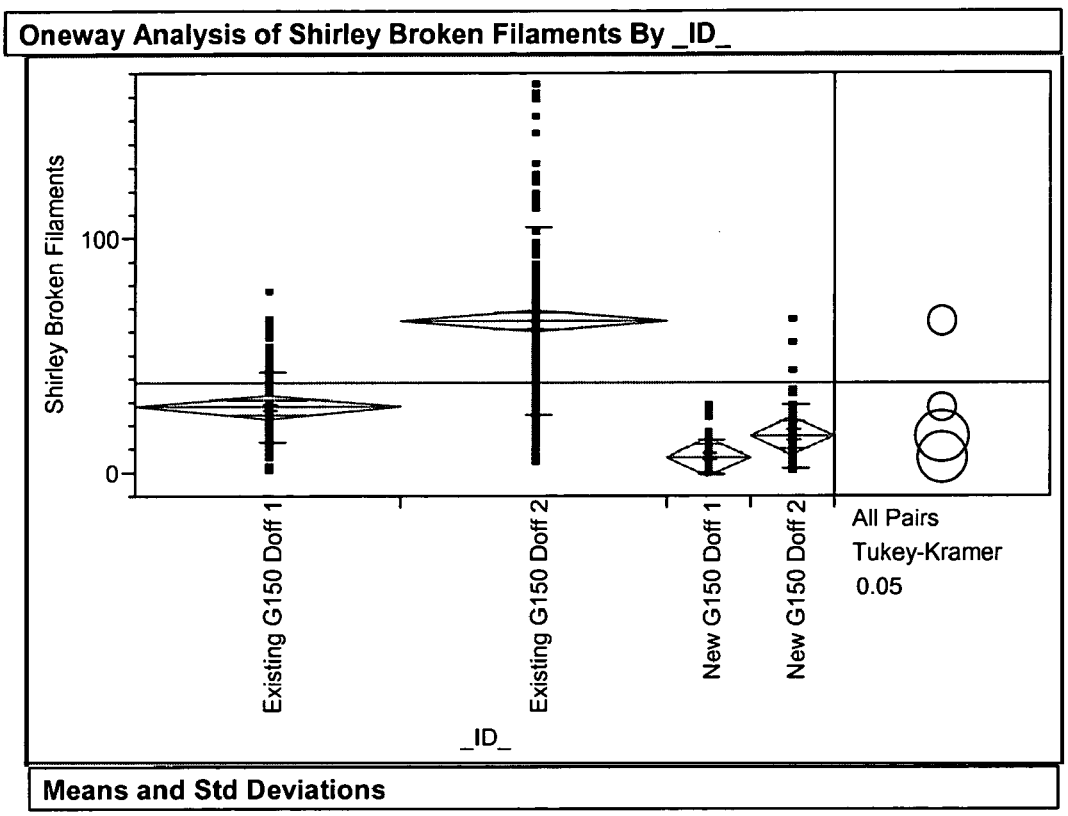
FIG. 1 is a chart comparing the number of broken filaments of an embodiment of a fiber glass product of the present invention with those of a presently available fiber glass product.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

The present invention relates to new sizing compositions for fiber glass. As used herein, the term "sizing composition" refers to a coating composition applied to fiber glass filaments immediately after forming and may be used interchangeably with the terms "binder composition," "binder," "sizing," and "size." The sizing compositions described herein generally relate to aqueous sizing composition. In one non-limiting embodiment, a sizing composition of the present invention is compatible with a large number of resins, including thermosetting resins, thermoplastic resins, and other polymeric resins. In one non-limiting embodiment, the sizing compositions are useful on fiber glass to be used in polyvinyl chloride (PVC) coating applications. Other non-limiting embodiments of the present invention relate to fiber glass strands coated with the sizing composition. Other non-limiting embodiments of the present invention relate to products that incorporate fiber glass strands.

The present invention will be discussed generally in the context of its use in the production, assembly, and application of glass fibers. However, one of ordinary skill in the art would understand that the present invention may be useful in the processing of other textile materials.

Persons of ordinary skill in the art will recognize that the present invention can be implemented in the production, assembly, and application of a number of glass fibers. Non-limiting examples of glass fibers suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof. Typical formulations of glass fibers are disclosed in K. Loewenstein, *The Manufacturing Technology of Continuous Glass Fibres*, (3d Ed. 1993). The present invention is particularly useful in the production, assembly, and application of glass fibers prepared from E-glass compositions.

Embodiments of fiber glass strands of the present invention can have several desirable properties. For example, embodiments of fiber glass strands can be at least partially coated with a sizing composition that results in the at least partially coated fiber glass strand being compatible with a number of resins while exhibiting desirable levels of broken filaments, desirable abrasion resistance, desirable strand integrity, and/or desirable strand friction, as well as other properties. The desired level of a particular property may depend on the application or end use. For example, relatively low strand friction may be desirable for some applications with a large number of contact points. If a fiber glass strand has relatively high strand friction, the tension placed on the strand as it is unwound and processed will increase, which can result in breaks. Thus, a fiber glass product with a relatively high strand friction can be undesirable in certain processes due to the increased number of breaks that may be observed. From the perspective of a user of fiber glass products, an increased number of breaks may not be acceptable, particularly in a manufacturing environment.

In addition, strand friction is directly related to strand tension. Thus, a fiber glass product with high strand friction will also exhibit high strand tension and a fiber glass product with a lower strand friction will exhibit a lower strand tension. Most end users of fiber glass products may prefer to have the ability to adjust the tension in the fiber glass strands in their downstream processes. For example, an end user may prefer to increase and/or control the strand tension of a fiber glass product that it receives from a fiber glass manufacturer as it is unwound and processed by the end user. If the end user receives a fiber glass product with a high strand tension, the range of strand tension adjustments available to the end user may decrease (e.g., if there is a fixed upper limit of strand tension and an inability to decrease strand tension).

Embodiments of the present invention provide fiber glass strands having strand frictions that make the fiber glass strands desirable for certain processes, applications, and/or end uses. In one embodiment of the present invention, a fiber glass strand comprises at least one glass fiber at least partially coated with a sizing composition, the sizing composition comprising at least one rosin, at least one coupling agent, and at least one lubricant, wherein the fiber glass strand has a strand friction of about 90 grams or less. In other embodiments, the fiber glass strand can have a strand friction of about 75 grams or less. In other embodiments, the fiber glass strand can have a strand friction of about 65 grams or less. The present invention also relates to aqueous sizing compositions that can at least partially coat at least one glass fiber to provide a fiber glass strand having such strand friction values.

All references to strand friction values in the present invention should be understood to refer to the strand friction of a fiber glass strand measured using the following equipment and under the following conditions. A fiber glass strand is fed from a bobbin to a Whorl Tension device at a feed rate of 300 yards per minute. Whorl Tension devices are commercially available from McCoy-Ellison, Inc. of Monroe, N.C. The Whorl Tension device applies 15 grams of pretension to the strand. The strand then passes through a 500 gram tensiometer (Check-Line Part No. TE-500 from Electromatic Equipment Co. of Cedarhurst, N.Y.) which measures the actual pre-tension in grams. Following this, the strand passes around a one and five-eighths inch chrome-plated fixed Whorl cap which provides glass-to-metal friction. The strand then passes through another 500 gram tensiometer (Check-Line Part No. TE-500 from Electromatic Equipment Co. of Cedarhurst, N.Y.) which reads the post tension in grams. Multiple readings of the tension before and after the friction surface are saved in a data collection system. Strand friction is calculated as the absolute difference in pre and post tension. The strand friction values recited in the present application are the values measured using the technique described above.

Embodiments of the present invention relate to aqueous sizing compositions that, upon at least partial coating of at least one glass fiber, can result in a fiber glass strand that is compatible with a variety of resins and that can possess desirable physical properties. One embodiment of an aqueous sizing composition of the present invention for at least partially coating glass fibers as part of a fiber glass strand comprises at least one rosin in an amount greater than about 50 weight percent on a total solids basis; a first coupling agent comprising an aminofunctional silane; a second coupling agent; and a cationic lubricant. Each of the coupling agents, in some embodiments can be present in an amount to about 10 weight percent on a total solids basis. The aminofunctional silane can comprise aminopropyltrialkoxysilanes in one embodiment. In further embodiments, the sizing composition can further comprise a third coupling agent in an amount up to about 10 weight percent on a total solids basis. In some embodiments, the second and third coupling agents can comprise methacryloxypropyltrialkoxysilanes and/or glycidoxypropyltrialkoxysilanes. The cationic lubricant, in some non-limiting embodiments, can be present in an amount up to about 10 weight percent on a total solids basis. The aqueous sizing composition can further comprise a nonionic lubricant. The nonionic lubricant, in some embodiments, can comprise a wax.

Another embodiment of an aqueous sizing composition for at least partially coating glass fibers as part of a fiber glass strand can comprise at least one rosin in an amount up to about 90 weight percent on a total solids basis; a first coupling agent in an amount up to about 5 weight percent on a total solids basis, the first coupling agent comprising aminopropyltrialkoxysilanes; a second coupling agent in an amount up to about 5 weight percent on a total solids basis, the second coupling agent comprising glycidoxypropyltrialkoxysilanes; a third coupling agent in an amount up to about 5 weight percent on a total solids basis, the third coupling agent comprising methacyloxypropyltrialkoxysilanes; a cationic lubricant in an amount up to about 10 weight percent on a total solids basis; and a nonionic lubricant in an amount up to about 10 weight percent on a total solids basis.

An embodiment of a fiber glass strand comprises at least one glass fiber at least partially coated with a sizing composition, the sizing composition comprising at least one rosin in an amount greater than about 50 weight percent on a total solids basis; a first coupling agent comprising an aminofunctional silane; a second coupling agent; and a cationic lubricant. Each of the coupling agents, in some embodiments, can be present in an amount to about 10 weight percent on a total solids basis. The aminofunctional silane can comprise aminopropyltrialkoxysilanes in one embodiment. In further embodiments, the sizing composition can further comprise a third coupling agent in an amount up to about 10 weight percent on a total solids basis. In some embodiments, the second and third coupling agents can comprise methacryloxypropyltrialkoxysilanes and/or glycidoxypropyltrialkoxysilanes. The cationic lubricant, in some non-limiting embodiments, can be present in an amount up to about 10 weight percent on a total solids basis. The aqueous sizing composition can further comprise a nonionic lubricant. The nonionic lubricant, in some embodiments, can comprise a wax.

Another embodiment of a fiber glass strand comprises at least one glass fiber at least partially coated with a sizing composition, the sizing composition comprising at least one rosin in an amount in an amount up to about 90 weight percent on a total solids basis; a first coupling agent in an amount up to about 5 weight percent on a total solids basis, the first coupling agent comprising aminopropyltrialkoxysilanes; a second coupling agent in an amount up to about 5 weight percent on a total solids basis, the second coupling agent comprising glycidoxypropyltrialkoxysilanes; a third coupling agent in an amount up to about 5 weight percent on a total solids basis, the third coupling agent comprising methacyloxypropyltrialkoxysilanes; a cationic lubricant in an amount up to about 10 weight percent on a total solids basis; and a nonionic lubricant in an amount up to about 10 weight percent on a total solids basis.

Other embodiments of the present invention relate to aqueous sizing compositions that are adapted to at least partially coat glass fibers for non-air jet weaving applications. Fiber glass strands useful in air jet weaving applications can possess certain properties that may not be desirable in the end uses contemplated for fiber glass strands coated with sizing compositions of the present invention.

As used herein, "air jet weaving" means a type of fabric weaving using an air jet loom in which fill yarn (weft) is inserted into a warp shed formed by the warp yarn by a blast of compressed air from one or more air jet nozzles, in a manner well known to those skilled in the art. The fill yarn is propelled across the width of the fabric, typically 10 to 60 inches (0.254 to 1.524 meters), by the compressed air. One non-limiting example of an application where air jet weaving can be utilized is circuit boards.

To facilitate air jet weaving, fiber glass strands used as fill yarns preferably need to "open up" to allow the air to push it through. The ability of fiber glass strands to open can be expressed in terms of strand integrity and/or air drag. Certain components of sizing compositions are believed to assist in the opening of fiber glass strands for air jet weaving. These components can include film-formers and "discrete particles," such as those discrete particles described in U.S. Pat. No. 6,593,255. Fiber glass strands adapted for use in air jet weaving applications are also preferably resistant to hydrolysis. Fiber glass strands adapted for use in air jet weaving applications may also exhibit higher strand frictions than would be acceptable in applications contemplated by the present invention.

Embodiments of sizing aqueous compositions of the present invention are adapted to at least partially coat glass fibers for non-air jet weaving applications. Applications for which embodiments of the present invention are contemplated may not require the fiber glass strands to possess properties that are desirable for air jet weaving applications, such as those described above. One embodiment of an aqueous sizing composition for glass fibers of the present invention comprises at least one rosin, at least one coupling agent, and at least one lubricant, wherein the sizing composition is adapted to at least partially coat glass fibers for non-air jet weaving applications. One embodiment of a fiber glass strand of the present invention comprises at least one glass fiber at least partially coated with a sizing composition, the sizing composition comprises at least one rosin, at least one coupling agent, and at least one lubricant, wherein the fiber glass strand is adapted for non-air jet weaving applications.

Turning now to the components of embodiments of aqueous sizing compositions of the present invention, aqueous sizing compositions of the present invention can comprise at least one rosin. In one non-limiting embodiment of the present invention, the at least one rosin comprises at least one of natural rosins, chemically-modified rosins, and combinations thereof.

Useful natural rosins include, but are not limited to, gum rosins, wood rosins, tall-oil rosins, and mixtures thereof. Non-limiting examples of suitable gum rosins include the residues obtained after the distillation of turpentine oil from the oleoresin tapped from living trees. Useful wood resins contain the residue obtained by extracting pine stumps with naphtha and distilling off the volatile fraction. Non-limiting examples of appropriate tall-oil rosins are the by-products of the fractionation of tall oil.

Useful chemically-modified rosins include rosins that have been chemically altered such that they no longer exhibit the distinct characteristics of natural rosins. In one non-limiting embodiment, chemically-modified rosins include rosins that have been chemically altered such that the chemically-modified rosin is readily dispersible in water. A water dispersible, chemically-modified rosin can be desirable in embodiments of the present invention as the water dispersibility of the rosin would facilitate the rosin's use in aqueous sizing composition. In one non-limiting embodiment, the chemically-modified rosin includes at least one dimer and at least one decarboxylated resin acid. In one non-limiting embodiment, the chemically-modified rosin comprises modified abietic acid. A non-limiting example of a useful chemically-modified rosin includes DYNAKOLL SI 100, which was purchased from Eka Chemicals AB, Sweden, which is believed to be a mixture of several reaction products formed when wood rosin is reacted with maleic anhydride, polyethylene glycol, and phenyl glycidyl ether. Thus, it is believed that DYNAKOLL SI 100 comprises, for example, at least one glycidyl ether group, such as two glycidyl ether groups, and at least one polyethylene glycol group. Dynakoll SI 100 is advantageously dispersible in water.

Chemically-modified rosins, such as DYNAKOLL SI 100, can provide a number of desirable attributes when coated on fiber glass as part of a sizing composition. For example, chemically-modified rosins can provide desirable frictional properties for building a forming package, can allow package payout without excessive ringer problems, can yield a product with high abrasion resistance, can act as an external lubricant (e.g., protect the strand against external contact points such as gathering shoes and spirals in forming, brass rods and travelers in twisting, contact points in downstream processing, etc.), and can provide other benefits. In conventional sizing compositions, a plurality of components may be needed to provide such attributes. In contrast, when an appropriate amount of rosin is used in a sizing composition of the present invention, the rosin can impart some or all of these properties to the product.

In one non-limiting embodiment, the amount of rosin can comprise fifty (50) percent or greater weight percent of the sizing composition based on total solids. In another non-limiting embodiment, the amount of rosin can comprise sixty (60) to ninety (90) weight percent of the sizing composition based on total solids. In another non-limiting embodiment, the amount of rosin can comprise seventy-five (75) to eighty-five (85) weight percent of the sizing composition based on total solids.

Embodiments of sizing compositions of the present invention also comprise one or more coupling agents. Non-limiting examples of coupling agents that can be used in the sizing compositions of the present invention include organo-silane coupling agents, transition metal coupling agents, amino-containing Werner coupling agents, chrome coupling agents, and mixtures thereof. These coupling agents typically have multiple functionality. Each metal or silicon atom has attached to it one or more groups which can react with the glass fiber surface or otherwise be chemically attracted, but not necessarily bonded, to the glass fiber surface. A coupling agent also interacts and/or reacts with a resin or resins that may be used in an end product, such that the coupling agent facilitates adhesion between the glass fibers and the resin or resins.

Embodiments of sizing compositions of the present invention can comprise organo-silane coupling agents. Non-limiting examples of suitable organo-silane coupling agents include A-187 gamma-glycidoxypropyltrimethoxysilane, A-1100 gamma-aminopropyltriethoxysilane, A-174 gamma-methacryloxypropyltrimethoxysilane, and A-1120 N-(beta-aminoethyl)-gamma-aminopropyltrimethoxysilane, each of which is commercially available from OSi Specialties of Tarrytown, N.Y., as well as DYNASYLAN® GLYMO 3-glycidyloxypropyltrimethoxysilane, DYNASYLAN® MEMO 3-methacryloxypropyl-trimethoxysilane, and DYNASYLAN® AMEO 3-aminopropyltriethoxysilane from Degussa AG of Dusseldorf, Germany.

In one non-limiting embodiment, a gamma-methacryloxypropyltrimethoxysilane, such as A-174 from Osi Specialties, may be used with rosins in sizing compositions of the present invention. Such an embodiment may be useful with resins comprising vinyl addition polymers, such as polyvinyl chloride. When a single coupling agent is used, the amount of coupling agent can be between one (1) and fifteen (15) weight percent of the sizing composition on a total solids basis. In further embodiments, the amount of coupling agent can be between one (1) and ten (10) weight percent of the sizing composition on a total solids basis. In further embodiments, the amount of coupling agent can be between four (4) and six (6) weight percent of the sizing composition on a total solids basis.

Non-limiting embodiments of sizing compositions of the present invention can also comprise a plurality of coupling agents. The multiple coupling agents can advantageously result in the sizing composition being compatible with a variety of resins, including thermosetting resins, thermoplastic resins, and other resins. The different functionalities on the coupling agents can result in the sizing composition being compatible with resins that are normally compatible with such functionalities. The amount and type of each coupling agent used in a sizing composition of the present invention may be selected based on resin compatibility, effect on fiber glass strand properties (e.g., lower broken filaments, abrasion resistance, strand integrity, and strand friction), and compatibility with other components of the sizing composition. For example, aminofunctional silanes, and in particular gamma-aminopropyltriethoxysilanes, are believed to have a desirable effect on strand friction (e.g., reduce strand friction, which may be desirable for certain applications) when used in sizing compositions of the present invention.

In some embodiments, the organo silane coupling agents that can be used in various combinations and amounts include glycidoxypropyltrialkoxysilanes, methacryoxypropyltrialkoxysilanes, and aminofunctional silanes. Non-limiting examples of suitable organo silane coupling agents that can be used in various combinations and amounts in such embodiments include A-187 gamma-glycidoxypropyltrimethoxysilane from OSi Specialties, A-174 gamma-methacryloxypropyltrimethoxysilane from OSi Specialties, DYNASYLAN® GLYMO 3-glycidyloxypropyltrimethoxysilane from Degussa AG of Dusseldorf, Germany, DYNASYLAN® MEMO 3-methacryloxypropyl-trimethoxysilane from Degussa, and aminofunctional silanes, such as A-1100 gamma-aminopropyltriethoxysilane, A-1120 N-(beta-aminoethyl)-gamma-aminopropyltrimethoxysilane, and other aminofunctional silanes in the A-1100 series from OSi Specialties, as well as DYNASYLAN® AMEO 3-aminopropyltriethoxysilane from Degussa AG of Dusseldorf, Germany. Other organo-silanes may also be used.

In one non-limiting embodiment, a sizing composition of the present invention comprises at least three coupling agents: at least one methacryloxypropyltrialkoxysilane, such as A-174 from OSi Specialties or DYNASYLAN® MEMO from Degussa AG; at least one glycidoxypropyltrialkoxysilane, such as A-187 from OSi Specialties or DYNASYLAN® GLYMO from Degussa AG; and at least one aminopropyltrialkoxysilane, such as A-1100 from OSi Specialties or DYNASYLAN® AMEO from Degussa AG. In this embodiment, the amount of aminopropyltrialkoxysilane can be up to ten (10) weight percent of the sizing composition on a total solids basis, the amount of glycidoxypropyltrialkoxysilane can be up to ten (10) weight percent of the sizing composition on a total solids basis, and the amount of methacryloxypropyltrialkoxysilane can be up to ten (10) weight percent of the sizing composition on a total solids basis. In a further embodiment, the amount of aminopropyltrialkoxysilane can be up to five (5) weight percent of the sizing composition on a total solids basis, the amount of glycidoxypropyltrialkoxysilane can be up to five (5) weight percent of the sizing composition on a total solids basis, and the amount of methacryloxypropyltrialkoxysilane can be up to five (5) weight percent of the sizing composition on a total solids basis. In a further embodiment, the amount of aminopropyltrialkoxysilane can be up to three (3) weight percent of the sizing composition on a total solids basis, the amount of glycidoxypropyltrialkoxysilane can be up to five (5) weight percent of the sizing composition on a total solids basis, and the amount of methacryloxypropyltrialkoxysilane can be up to five (5) weight percent of the sizing composition on a total solids basis.

In addition to compatibility with particular resins, the presence of aminopropyltrialkoxysilanes, such as aminopropyltriethoxysilane, in embodiments of sizing compositions of the present invention, has been observed to reduce friction during manufacture and processing of fiber glass strands coated with the sizing composition when used in combination with at least one other silane. Such friction reduction properties are not normally associated with aminopropyltrialkoxysilanes. However, experimental data suggest that the presence of aminopropyltrialkoxysilanes in embodiments of sizing compositions of the present invention has an effect on friction reduction. Thus, in applications where friction of the fiber glass strands is of some concern, it may be desirable to include aminopropyltrialkoxysilanes as part of a sizing composition with at least one other silane in accordance with the present invention.

In one non-limiting embodiment, a sizing composition of the present invention may further comprise at least one lubricant. Lubricants can be used, for example, in sizing compositions of the present invention to assist with internal lubrication (e.g., fiber-to-fiber abrasion) and to assist with external lubrication (e.g., glass-to-contact point abrasion). Lubricants can be selected for use in embodiments of the present invention to provide such properties to the sizing composition. In some non-limiting embodiments, the at least one lubricant may comprise at least one cationic lubricant. In some non-limiting embodiments, the at least one lubricant may comprise at least one non-ionic lubricant. In other embodiments, the at least one lubricant may comprise at least one cationic lubricant and at least one nonionic lubricant.

Cationic lubricants may be used in embodiments of the present invention, for example, to assist with internal lubrication, such as by reducing filament-to-filament or glass-to-glass abrasion. In general, most cationic lubricants known to those of skill in the art can be used in embodiments of the present invention. Non-limiting examples of cationic lubricants suitable in the present invention include lubricants with amine groups, lubricants with ethoxylated amine oxides, and lubricants with ethoxylated fatty amides. A non-limiting example of a lubricant with an amine group is a modified polyethylene amine, e.g. EMERY 6717, which is a partially amidated polyethylene imine commercially available from Cognis Corporation of Cincinnati, Ohio. Another example of a cationic lubricant useful in embodiments of the present invention is ALUBRASPIN 226, which is a partially amidated polyethylene imine commercially available from BASF Corp. of Parsippany, N.J.

In one non-limiting embodiment of a sizing composition utilizing a cationic lubricant, the amount of cationic lubricant can comprise up to ten (10) weight percent of the sizing composition based on total solids. In another non-limiting embodiment, the amount of cationic lubricant can comprise between one (1) and eight (8) weight percent of the sizing composition based on total solids. In a further non-limiting embodiment, the amount of cationic lubricant can comprise between one (1) and six (6) weight percent of the sizing composition based on total solids.

Sizing compositions of the present invention also comprise at least one nonionic lubricant. Nonionic lubricants useful in the present invention may advantageously reduce yarn friction, increase lubrication, protect against glass-to-contact point abrasion during manufacture and in downstream processing (e.g., at a customer of a fiber glass manufacturer), etc. For example, nonionic lubricants useful in the present invention may reduce fiber to metal friction during manufacture and processing.

In one non-limiting embodiment, the nonionic lubricant may comprise at least one wax. Examples of waxes suitable for use in the present invention include polyethylene wax, paraffin wax, polypropylene wax, microcrystalline waxes, and oxidized derivatives of these waxes. One example of a polyethylene wax suitable for use in the present invention is Protolube HD-A, which is a high density polyethylene wax commercially available from Bayer Corporation of Pittsburgh, Pa. An example of a paraffin wax suitable in embodiments of the present invention is Elon PW, which is a paraffin wax emulsion commercially available from Elon Specialties of Concord, N.C.

Other nonionic lubricants, aside from waxes, could also be used. In selecting nonionic lubricants other than the waxes discussed above, compatibility with the other components of the sizing composition, particularly the rosin, is an important consideration. For example, some oils may be used as nonionic lubricants in some embodiments. Examples of suitable oils can include triglyceride oils and partially hydrogenated oils based on palm, coconut, soybean, etc.

The amount of the at least one nonionic lubricant in sizing compositions of the present invention can be up to thirty (30) weight percent of the sizing composition on a total solids basis. In further embodiments, the amount of nonionic lubricant can be up to ten (10) weight percent of the sizing composition on a total solids basis. In further embodiments, the amount of nonionic lubricant can be between one (1) and six (6) weight percent of the sizing composition on a total solids basis. In one non-limiting embodiment, the sizing composition of the present invention comprises a high density polyethylene wax or a paraffin wax.

Sizing compositions of the present invention may optionally include a biocide. A biocide can be added as a precautionary measure to preclude potential problems associated with yeast, mold, aerobic bacteria, and other biological products. Any biocides known to those skilled in the art to control organic growth in sizing compositions for glass fibers can be used in sizing compositions of the present invention. Non-exclusive biocides that can be used in the present invention include organotin biocides, methylene thiocyanate biocides, and chlorinated compounds. An example of a metlylene thiocyanite biocide is CL-2141 biocide, which is a water-based MBT (methylene-bis-thiocyanate) manufactured by ChemTreat Inc. In one non-limiting embodiment, the amount of biocide can comprise up to five (5) weight percent of the sizing composition based on total solids. In another non-limiting embodiment, the amount of biocide can comprise up to two (2) weight percent of the sizing composition based on total solids.

In one non-limiting embodiment, a sizing composition of the present invention may comprise 60 to 90 weight percent rosin, up to 10 weight percent cationic lubricant, up to 15 weight percent organo silane coupling agent, up to 15 weight percent nonionic lubricant, and up to two weight percent biocide on a total solids basis based on the total weight of the sizing composition.

In another non-limiting embodiment, a sizing composition of the present invention may comprise 70 to 90 weight percent rosin, up to 10 weight percent cationic lubricant, up to 10 weight percent of at least one organo silane coupling agent, up to 10 weight percent nonionic lubricant, and up to two weight percent biocide on a total solids basis based on the total weight of the sizing composition.

In another non-limiting embodiment, a sizing composition of the present invention may comprise 70 to 90 weight percent rosin, up to 10 weight percent cationic lubricant, up to five (5) weight percent aminopropyltrimethoxysilane, up to five (5) weight percent of glycidoxypropyltrimethoxysilane, up to five (5) weight percent methacryloxypropyltrimethoxysilane, up to 10 weight percent nonionic lubricant, and up to two weight percent biocide on a total solids basis based on the total weight of the sizing composition.

Embodiments of sizing compositions of the present invention may also comprise other components found in sizing compositions, such as antistatic agents, anti-foaming agents, wetting agents, and other additives.

The present invention also relates to fiber glass strands comprising at least one glass fiber at least partially coated with an embodiment of a sizing composition of the present invention. Glass fibers are produced by flowing molten glass via gravity through a multitude of small openings in a precious metal device, called a bushing. After the fibers have cooled very shortly after their issuance from the bushing and usually in close proximity to the bushing, these fibers are at least partially coated with a sizing composition of the present invention. The sizing composition can be applied by sprayers, rollers, belts, metering devices, or other similar application devices. The sized glass fibers are gathered into strands comprising a plurality of individual fibers, generally from 200 to more than 4000.

After their formation and treatment, the strands are typically wound into a "forming package." The strands can be wound onto a paper or plastic tube using a winder. The forming packages are usually dried in either an oven or at room temperature to remove some of the moisture from the fibers. Additional information related to fiberizable glass compositions and methods of making glass filaments are disclosed in K. Loewenstein, *The Manufacturing Technology of Glass Fibres*, (3d Ed. 1993) at pages 30-44, 47-60, 115-122 and 126-135, which are hereby incorporated by reference. For certain uses, the strands are then typically wound onto a bobbin via conventional textile twisting techniques such as a twist frame.

The amount of sizing composition on the strand may be measured as "loss on ignition" or "LOI". As used herein, the term "loss on ignition" or "LOI" means the weight percent of dried sizing composition present on the fiber glass as determined by Equation 1:

$$LOI = 100 \times [(W_{dry} - W_{bare})/W_{dry}] \qquad \text{(Eq. 1)}$$

wherein $W_{dry}$ is the weight of the fiber glass plus the weight of the coating after drying in an oven at 220° F. (about 104° C.) for 60 minutes, and $W_{bare}$ is the weight of the bare fiber glass after heating the fiber glass in an oven at 1150° F. (about 621° C.) for 20 minutes and cooling to room temperature in a dessicator.

In general, although not limiting, the loss on ignition (LOI) of an embodiment of a fiber glass strand of the present invention may be up to 2.5 weight percent. In other non-limiting embodiments, the LOI may be up to 2.0 percent. In further non-limiting embodiments, the LOI may be up to 1.0 weight percent. At lower LOI levels, the broken filament levels of a fiber glass product can increase. However, increasing the LOI increases production costs. Thus, in one non-limiting embodiment, the LOI may be between about 0.3 and about 0.7 weight percent.

In one non-limiting embodiment, a fiber glass strand of the present invention can comprise between twenty (20) and ten thousand (10,000) filaments per strand. In another non-limiting embodiment, a fiber glass strand of the present invention can comprise between two thousand (2000) and four thousand five hundred (4,500) filaments per strand. The strands, in non-limiting examples, can be from fifty yards per pound to more than one thousand yards per pound depending on the application.

The diameter of the filaments used in non-limiting embodiments of fiber glass strands of the present invention may be between, in general, between five (5) and eighty (80) microns. In another non-limiting embodiment, the diameter of the filaments may be between seven (7) and eighteen (18) microns.

Fiber glass strands at least partially coated with sizing compositions of the present invention are advantageously compatible with a large number of resins based in part on the sizing composition. Embodiments of sizing compositions of the present invention which utilize a plurality of different silanes assist in facilitating this multi-resin compatibility. Non-limiting examples of thermosetting resins with which the sizing compositions of the present invention may be compatible include diallyl phthalates, cycloaliphatic epoxides, epoxies, furans, melamines, phenolics, polybutadienes, polyester, crosslinked polyethylenes, and polyimides. Non-limiting examples of thermoplastic resins with which the sizing compositions of the present invention may be compatible include nylon, polycarbonate, polybutylene terephthalate, polyethylene, polypropylene, polyvinyl chloride, polyvinyl chloride plastisol, and urethane. Non-limiting examples of other polymeric resins with which the sizing compositions of the present invention may be compatible include acrylics, cellulosics, neoprenes, nitrites, nitrocelluloses, polyamides, polyethers, polyolefins, polysulfides, polyurethanes, polyvinyl butyral, silicone, styrene-butadiene, urea-formaldehyde, and vinyls.

Due to the compatibility of the sizing compositions and the fiber glass strands of the present invention, the fiber glass strands can be used in a wide range of applications including, for example, screens, tapes, flooring products, aviation composite materials, aerospace composite materials, fabrics for marine applications, window shades, braided products, scrim fabrics, filters, and others. Such products can be formed from fiber glass strands of the present invention using techniques known to those of ordinary skill in the art.

Embodiments of the present invention will now be illustrated in the following specific, non-limiting examples.

EXAMPLE 1

A non-limiting embodiment of a sizing composition of the present invention was prepared in accordance with the following formulation:

TABLE 1

| Component | Amount (parts by weight) | % of Solids |
|---|---|---|
| Rosin[1] | 5340 | 85% |
| Lubricant[2] | 315 | 5% |
| Acetic Acid[3] | 30 | 0% |
| Silane[4] | 315 | 5% |
| Wax[5] | 315 | 5% |
| Biocide[6] | 1.5 | 0% |
| Water (Main Mix) | 30 gallons | 0% |
| Total Solids = | | 100.0% |

[1]DYNAKOLL SI 100 chemically modified rosin which was purchased from Eka Chemicals AB, Sweeden.
[2]EMERY 6717 partially amidated polyethylene imine from Cognis Corporation of Cincinnati, Ohio.
[3]Generic glacial acetic acid.
[4]A-174 gamma-methacryloxypropyltrimethoxysilane from OSi Specialties of Tarrytown, NY.
[5]Elon PW paraffin wax emulsion from Elon Specialties of Concord, NC.
[6]CL-2141 biocide, which is a water-based MBT (methylene-bis-thiocyanate) from ChemTreat Inc.

A sizing composition comprising the ingredients in Table 1 may be prepared by first adding three gallons of hot water for the rosin to a premix bucket with agitation. The rosin was then added to the hot water and agitated for ten minutes to disperse the rosin. The rosin was then transferred to a main mix tank.

One-half gallon of hot water for the lubricant was then added to a premix bucket with agitation. The lubricant was added to the hot water and agitated for ten minutes to disperse the lubricant. The lubricant dispersion was then added to the main mix tank.

For the silane, one-half gallon of cold water was first added to a premix bucket with agitation. The acetic acid was then added to the cold water with agitation. The A-174 silane was then added to the acidified cold water and agitated for five minutes or until the solution was clear-blue in color. The silane solution was then transferred to the main mix tank.

The wax and the biocide are then sequentially added to the main mix tank. Cold water was then added to the main mix tank to dilute the sizing composition to a final volume of thirty (30) gallons. The main mix tank was agitated for ten minutes. The sizing composition had a total percent solids of 5.56% and a pH of 6.33.

Fiber glass filaments, having a nominal filament diameter of nine microns ("G filament") were formed using a bushing and then at least partially coated with the sizing composition using a sizing applicator. The sizing composition used to coat the fiber glass filaments was prepared in accordance with the formulation set forth in Table 1. The nominal loss on ignition of the fiber glass was 0.6 weight percent. The fiber glass filaments were gathered into strands and then wound into a forming package on a winder. After drying using conventional techniques, the forming package was fed to a twist frame where the strand from the forming package was twisted 1.3 turns in the "Z" direction and wound on a bobbin. Ten bobbins from each forming package or "doff" were collected for testing. The fiber glass product was a G 150 product, meaning the filaments were nominal "G filaments" and a single strand weighed 15,000 yards per pound (~33 tex). This fiber glass product, which is a non-limiting embodiment of the present invention, will be referred to in this Example as "the new G-150 product."

Properties of the new G-150 product were compared to a current commercial G-150 product, PPG's G-150 coated with 880 binder at a 1.10 percent norminal LOI (hereinafter "the existing G-150 product"). Other than the sizing composition, the new G-150 product and the existing G-150 product were formed and wound under the same conditions.

The two products were tested for broken filaments, abrasion resistance, and strand integrity. As demonstrated below, the new G-150 product exhibited lower broken filaments, improved abrasion resistance, and superior strand integrity as measured by air drag when compared to the existing G-150 product.

Broken filaments of the two products were measured using a Shirley SDL Model No. 02094 broken filament counter, manufactured by SDL International Group of Stockport, England. Numerous bobbins of each product were measured for broken filaments. The units of measurement were the number of broken filaments per 2400 meters of strand.

The results are summarized in Table 2 below and in FIG. 1.

TABLE 2

| Product | Number of Bobbins Measured | Mean Broken Filaments per Segment | Standard Deviation |
| --- | --- | --- | --- |
| New G-150 Doff 1 | 41 | 6.66 | 7.14 |
| New G-150 Doff 2 | 40 | 16.2 | 13.8 |
| Existing G-150 Doff 1 | 129 | 28.2 | 15.2 |
| Existing G-150 Doff 2 | 129 | 62.1 | 39.7 |

As exhibited in Table 2, the new G-150 product exhibited lower broken filaments than the existing G-150 product. Reduced broken filaments allow the fiber glass strands to be manufactured with less complications and to be more easily processed. The new G-150 product also exhibited more uniform properties, as the standard deviation for the broken filaments data were smaller for the new G-150 product.

The abrasion resistance of the new G-150 product was also compared to the abrasion resistance of the existing G-150 product. The abrasion resistance was measured by measuring the number of broken filaments as the gate tension was increased. Fiber glass strands of the new G-150 product and the existing G-150 product were supplied to a Model UTC-2003 gate tensioner from Steel Heddle, Inc. of Greenville, S.C. As the gate tension was increased, the number of broken filaments were counted using a Shirley Yarn Hairiness Meter winder from Shirley Developments, Ltd. of Manchester, England. Ten bobbins of the new G-150 product and ten bobbins of the existing G-150 product were tested at each gate.

Figure 2:
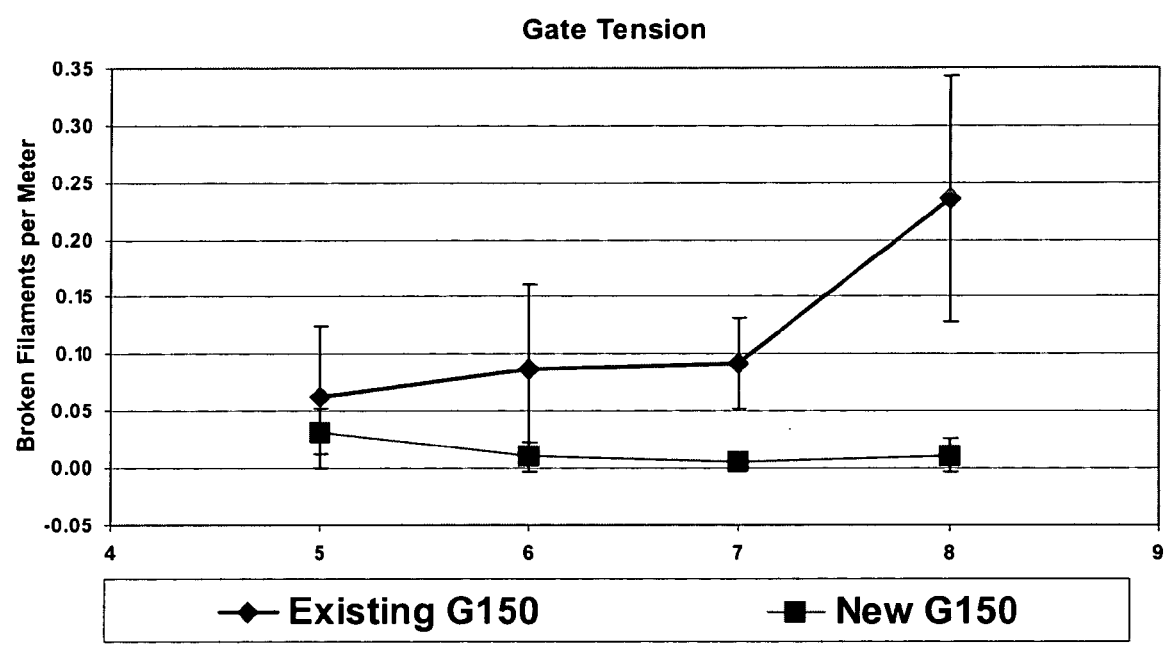
FIG. 2 is a graph comparing the abrasion resistance of an embodiment of a fiber glass product of the present invention with that of a presently available fiber glass product.

FIG. 2 illustrates the results of the abrasion resistance testing. FIG. 2 illustrates the change in the number of broken filaments per meter of both the new G-150 product and the existing G-150 product as the gate tension was increased. A larger number of broken filaments per meter indicates that the fiber glass is less resistant to abrasion. As noted above, ten bobbins were measured for each product at each gate. The line data points in FIG. 2 represent mean values and the error bars are plus or minus 1-standard deviation. As shown in FIG. 2, the new G-150 product exhibited an average of less than 0.05 broken filaments per meter at all of the gate tensions measured while the existing G-150 was above this amount. Further, the number of broken filaments per meter of the existing G-150 product increased as the gate tension increased from 5 to 8, while the broken filaments per meter of the new G-150 product decreased from gate 5 to gate 6 and then remained relatively constant between gates 6 and 8.

The strand integrity of the new G-150 product was also compared to the strand integrity of the existing G-150 product. The strand integrities of the fiber glass products were determined by measuring air drag as set forth below.

Air drag is an indicator of strand integrity because a fiber glass strand that retains a tight filament bundle will exhibit less air drag when air is blown past it. Stated conversely, the filament bundle of a strand exhibiting high air drag easily opens and is considered "air-friendly." Fiber glass strands that exhibit high air drag and that easily open can be particularly suited for air jet weaving applications. Some applications (e.g., non-air jet weaving applications) may prefer fiber glass strands that exhibit high strand integrity and low air drag.

Six bobbins of the existing G-150 product were tested for strand integrity by measuring air drag. Air drag is used as a measurement of strand integrity, indicating how easy or difficult it is for a given air pressure to open the filament bundle of a strand. The air drag was measured using a Model TE-200 two hundred gram tensiometer, manufactured by Electromatic Equipment Co., Inc. of Cedarhurst, N.Y., and an air jet nozzle from a Model L-5000 loom, manufactured by Sulzer Ruti. Air drag readings were taken by data collection software at different pressures controlled by pressure regulators and solenoid valves. Air was applied to the air jet nozzle and the tension was measured as air drag. The data collection software collected two hundred readings at each pressure setting and calculated the average air drag. Nine bobbins of the new G-150 product were also tested for strand integrity using this machine. The air drag of the strand from each bobbin was measured at air pressures of 25, 35, 40, 45, 50, and 55 psi.

Figure 3:
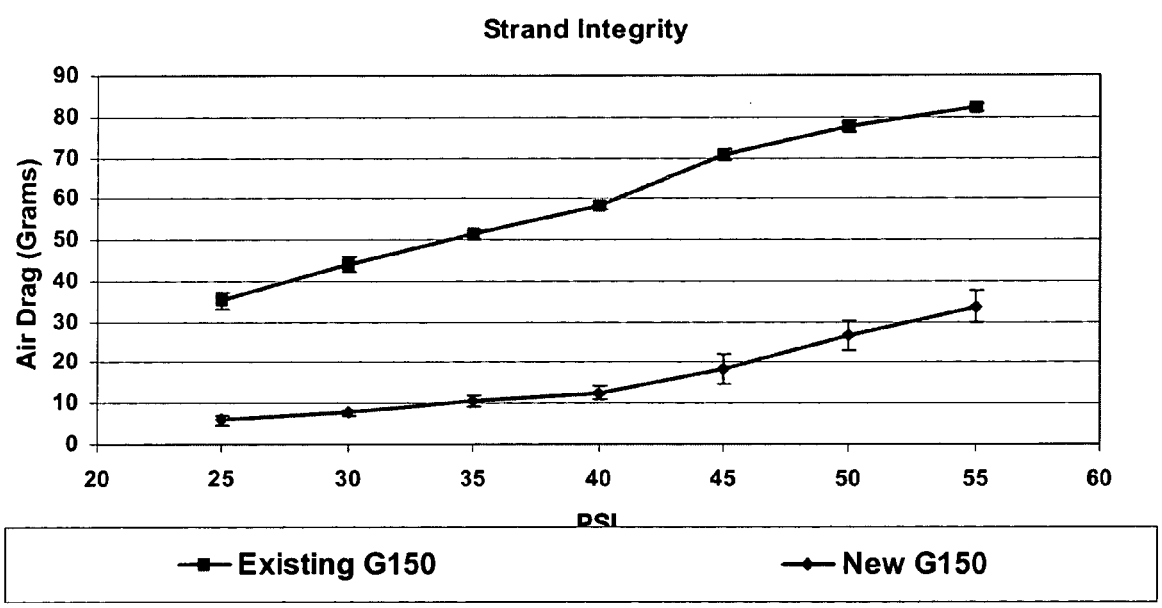
FIG. 3 is a graph comparing the strand integrity of an embodiment of a fiber glass product of the present invention with that of a presently available fiber glass product.

FIG. 3 is a graph that compares the air drag of the new G-150 product to the existing G-150 product. The line data points represent mean values (e.g., the data points for the new G-150 product represent the mean value of the nine bobbins tested at that air pressure) and the error bars represent differences of one standard deviation. As shown in FIG. 3, the air drag (and consequently the strand integrity) of the new G-150 product is considerably lower than the air drag of the existing G-150 product. Thus, the new G-150 product exhibited superior strand integrity. Such data also suggest that the new G-150 product is not suitable for air jet weaving applications.

EXAMPLE 2

Another non-limiting embodiment of a sizing composition of the present invention was prepared in accordance with the formulation shown in Table 3:

TABLE 3

30-gallon Formulation

| Component | Amount | | % of Solids |
| --- | --- | --- | --- |
| Hot Water for Rosin | 3.0 | gallons | 0% |
| Rosin[7] | 5510 | grams | 80% |
| Hot Water for Lubricant | 0.5 | gallons | 0% |
| Lubricant[8] | 343 | grams | 5% |
| Cold Water for First Silane | 0.5 | gallons | 0% |
| Acetic Acid[9] | 31 | grams | 0% |
| First Silane[10] | 269 | grams | 4% |
| Cold Water for Second Silane | 0.5 | gallons | 0% |

TABLE 3-continued

30-gallon Formulation

| Component | Amount | % of Solids |
|---|---|---|
| Acetic Acid[11] | 31 grams | 0% |
| Second Silane[12] | 269 grams | 4% |
| Cold Water for Third Silane | 0.5 gallons | 0% |
| Acetic Acid[13] | 15 grams | 0% |
| Third Silane[14] | 138 grams | 2% |
| Wax[15] | 1491 grams | 5% |
| Defoamer[16] | 46 grams | 0.1% |
| Biocide[17] | 1.5 grams | 0% |
| Total Solids = | | 100.0% |

[7]DYNAKOLL SI 100 chemically modified rosin which was purchased from Eka Chemicals AB, Sweeden.
[8]EMERY 6717 partially amidated polyethylene imine from Cognis Corporation of Cincinnati, Ohio.
[9]Generic glacial acetic acid.
[10]A-174 gamma-methacryloxypropyltrimethoxysilane from OSi Specialties of Tarrytown, NY.
[11]Generic glacial acetic acid.
[12]A-187 gamma-glycidoxypropyltrimethoxysilane from OSi Specialties of Tarrytown, NY.
[13]Generic glacial acetic acid.
[14]A-1100 gamma-aminopropyltriethoxysilane from OSi Specialties of Tarrytown, NY.
[15]Protolube HDA high density polyethylene wax from Bayer Corporation of Pittsburgh, PA.
[16]SAG 10 defoamer, which is a silicon-based antifoam emulsion from OSi Specialties of Tarrytown, NY.
[17]CL-2141 biocide, which is a water-based MBT (methylene-bis-thiocyanate) from ChemTreat Inc.

A sizing composition comprising the ingredients in Table 3 may be prepared by first adding hot water for the rosin to a premix bucket and beginning agitation. The rosin was then added to the hot water and agitated for ten minutes to disperse the rosin. The rosin was then transferred to a main mix tank.

The hot water for the lubricant was then added to a premix bucket with agitation. The lubricant was added to the hot water and agitated for ten minutes to disperse the lubricant. The lubricant dispersion was then added to the main mix tank.

For the first silane, cold water was first added to a premix bucket and agitation was begun. The acetic acid was then added to the cold water with agitation. The A-174 silane was then added to the acidified cold water and agitated for five minutes or until the solution was clear-blue in color. The first silane solution was then transferred to the main mix tank.

For the second silane, cold water was first added to a premix bucket and agitation was begun. The acetic acid was then added to the cold water with agitation. The A-187 silane was then added to the acidified cold water and agitated for five minutes or until the solution was clear. The second silane solution was then transferred to the main mix tank.

For the third silane, cold water was added to a premix bucket and agitation was begun. The acetic acid was then added to the cold water with agitation. The A-1100 silane was then added to the acidified cold water and agitated for five minutes or until the solution was clear. The third silane solution was then transferred to the main mix tank.

The wax, defoamer, and the biocide were then sequentially added to the main mix tank. Cold water was added to the main mix tank to dilute the sizing composition to a final volume of thirty (30) gallons. The main mix tank was agitated for ten minutes. The sizing composition had a total percent solids of 6.04% and a pH of 6.10.

Fiber glass filaments, having a nominal filament diameter of nine microns ("G filament") were formed using a bushing and then at least partially coated with the sizing composition using a sizing applicator. The sizing composition used to coat the fiber glass filaments was prepared in accordance with the formulation set forth in Table 3. The nominal loss on ignition of the fiber glass was 0.6%. The fiber glass filaments were gathered into strands and then wound on a winder. Two forming packages were collected. The forming packages were then twisted 1.3 turns in the "Z" direction, and wound on bobbins using conventional twist frames and standard twisting settings. Ten bobbins from each forming package or "doff" were collected for testing. The fiber glass product was a G 150 product, meaning the filaments were nominal "G filaments" and a single strand weighed 15,000 yards per pound (~33 tex). This fiber glass product, which is a non-limiting embodiment of the present invention, will be referred to in this Example as "the new G-150 product."

Properties of the new G-150 product were compared to a current commercial G-150 product, PPG's G-150 coated with 880 binder at a 1.10% nominal loss on ignition (hereinafter "the existing G-150 product"). Other than the sizing composition, the new G-150 product and the existing G-150 product were formed and wound under the same conditions.

The two products were tested for broken filaments, abrasion resistance, and friction. As demonstrated below, the new G-150 product exhibited lower broken filaments, improved abrasion resistance, and comparable friction when compared to the existing G-150 product.

Figure 4:
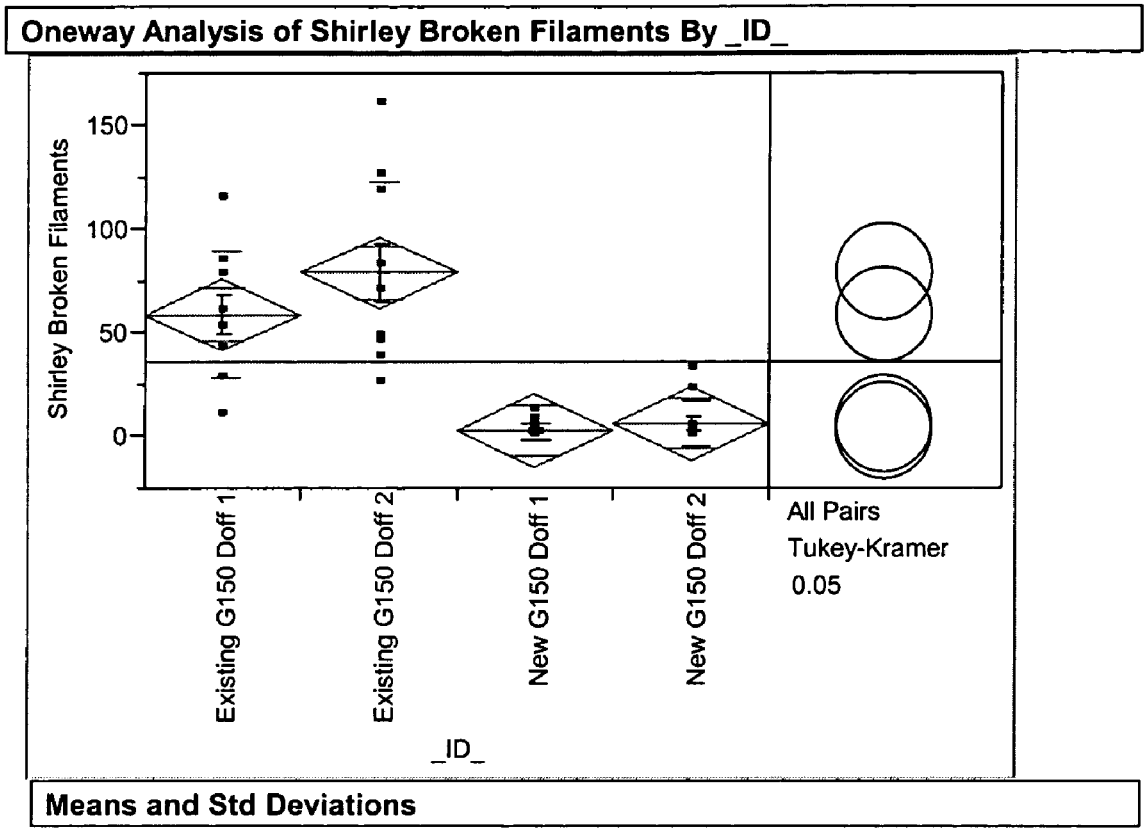
FIG. 4 is a chart comparing the number of broken filaments of an embodiment of a fiber glass product of the present invention with those of a presently available fiber glass product.

Broken filaments of the two products were measured using a Shirley SDL Model No. 02094 broken filament counter, manufactured by SDL International Group of Stockport, England. Ten bobbins of each product were measured for broken filaments. The number of broken filaments for every 2400 meters of strand from each bobbin was measured. The results are summarized in Table 4 below and in FIG. 4.

TABLE 4

| Product | Number of 2400 Meter Segments Measured | Mean Broken Filaments per Segment | Standard Deviation |
|---|---|---|---|
| New G-150 Doff 1 | 10 | 3.20 | 4.02 |
| New G-150 Doff 2 | 10 | 6.4 | 11.2 |
| Existing G-150 Doff 1 | 10 | 59.4 | 31.0 |
| Existing G-150 Doff 2 | 10 | 79.6 | 43.7 |

As exhibited in Table 4, the new G-150 product exhibited lower broken filaments than the existing G-150 product. Reduced broken filaments allow the fiber glass strands to be manufactured with less complications and to be more easily processed. The new G-150 product also exhibited more uniform properties, as the standard deviation for the broken filaments data were smaller for the new G-150 product.

The abrasion resistance of the new G-150 product was also compared to the abrasion resistance of the existing G-150 product. The abrasion resistance was measured by measuring the number of broken filaments as the gate tension was increased. Fiber glass strands of the new G-150 product and the existing G-150 product were supplied to a Model UTC-2003 gate tensioner from Steel Heddle of Greenville, S.C. As the gate tension was increased, the number of broken filaments were counted using a Shirley Yarn Hairiness Meter winder from Shirley Developments, Ltd. of Manchester, England. Ten bobbins of the new G-150 product and ten bobbins of the existing G-150 product were tested at each gate.

Figure 5:
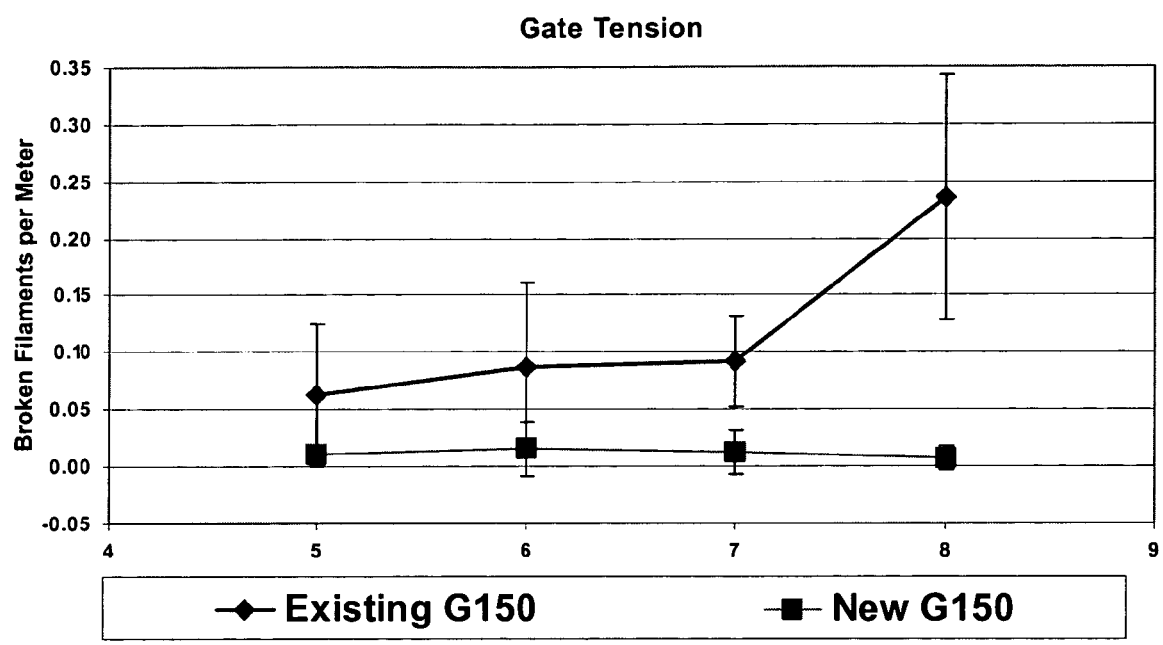
FIG. 5 is a chart comparing the abrasion resistance of an embodiment of a fiber glass product of the present invention with that of a presently available fiber glass product.

FIG. 5 illustrates the results of the abrasion resistance testing. FIG. 5 illustrates the change in the number of broken filaments per meter of both the new G-150 product and the existing G-150 product as the gate tension was increased. A larger number of broken filaments per meter indicates that the fiber glass is less resistant to abrasion. As noted above, ten bobbins were measured for each product at each gate. The line data points in FIG. 5 represent mean values and the error bars are plus or minus 1-standard deviation. As shown in FIG. 5, the new G-150 product exhibited an average of less than 0.02 broken filaments per meter at all of the gate tensions measured while the existing G-150 was above 0.5 broken filaments per meter. Further, the number of broken filaments per meter of the existing G-150 product increased as the gate tension increased from 5 to 8, while the broken filaments per meter of the new G-150 product remained relatively constant between gates 5 and 8.

Abrasion resistance was also measured using another testing technique. In this test, ten bobbins from two doffs of existing G-150 product (total of twenty bobbins) and ten bobbins from two doffs of the new G-150 product were tested for abrasion at a setting of Gate 8 on a Model UTC-2003 tensioner manufactured by Steel Heddle, Inc. of Greenville, S.C. The number of broken filaments per one hundred twenty meters were counted using a Model H21A1 phototransistor optical interrupter manufactured by Fairchild Semiconductor of South Portland, Me. Three samples from each bobbin were measured. The results are summarized in Table 5 below:

TABLE 5

| Product | Number of Measurements | Mean Broken Filaments at Gate 8 | Standard Deviation |
|---|---|---|---|
| New G-150 Doff 1 | 30 | 18.5 | 22.9 |
| New G-150 Doff 2 | 30 | 27.7 | 47.1 |
| Existing G-150 Doff 1 | 30 | 123.4 | 51.5 |
| Existing G-150 Doff 2 | 30 | 115.8 | 48.1 |

As exhibited in Table 5, the new G-150 product exhibited lower broken filaments under Gate 8 tension than the existing G-150 product. Accordingly, the new G-150 product also exhibited improved abrasion resistance based on this test.

The improved abrasion resistance of the new G-150 product was also observed visually at various processing steps of microwarping. Visual observations suggested that the new G-150 product is more resistant to abrasion and produces fewer broken filaments and less fuzz than the existing G-150 product. For example, strands of the new G-150 product exhibited fewer broken filaments when passed through an Accumeter Model 60-13 tensioner from Textrol Inc. of Monroe, N.C., with weights stacked on the strand for increased abrasion, than strands of the existing G-150 product. The accumulation of broken filaments in the strand guides of a creel was also observed to be less for the new G-150 product than the existing G-150 product when a plurality of bobbins were being paid out from the creel through the strand guides. The accumulation of fuzzballs in the strand guide-eyes of a common bobbin creel manufactured was also observed to be less for the new G-150 product than the existing G-150 product.

The strand friction of the new G-150 product was also compared to the strand friction of the existing G-150 product. It would be desirable for the new G-150 product to have strand friction values similar to the existing G-150 product. Similar friction values would indicate, for example, that a customer or end user could substitute the new product into an existing process without making adjustments in its tension control systems.

The strand friction of the fiber glass strands were measured using the following equipment and under the following conditions. A fiber glass strand was fed from a bobbin to a Whorl Tension device at a feed rate of 300 yards per minute. Whorl Tension devices are commercially available from McCoy-Ellison, Inc. of Monroe, N.C. The Whorl Tension device applied 15 grams of pre-tension to the strand. The strand then passed through a 500 gram tensiometer (Check-Line Part No. TE-500 from Electromatic Equipment Co. of Cedarhurst, N.Y.) which measured the actual pretension in grams. Following this, the strand passed around a one and five-eighths inch chrome-plated fixed Whorl cap which provided glass-to-metal friction. The strand then passed through another 500 gram tensiometer (Check-Line Part No. TE-500 from Electromatic Equipment Co. of Cedarhurst, N.Y.) which reads the post tension in grams. Multiple readings of the tension before and after the friction surface were saved in a data collection system. Strand friction was calculated as the absolute difference in pre and post tension. The mean strand friction and standard deviation were calculated for each bobbin measured. Twenty bobbins of the existing G-150 and six bobbins of the new G-150 product were measured for strand friction.

Figure 6:
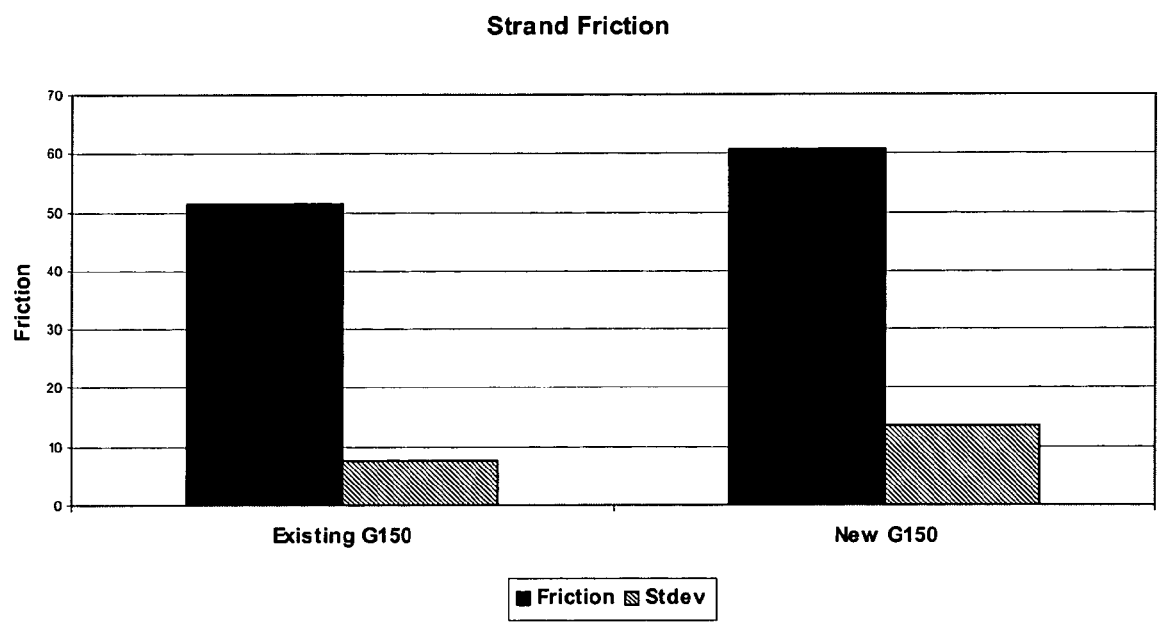
FIG. 6 is a chart comparing the strand friction of an embodiment of a fiber glass product of the present invention with that of a presently available fiber glass product.

FIG. 6 is a chart that summarizes the strand friction data. As shown in FIG. 6, the strand friction of the new G-150 product was comparable to the existing G-150 product and at a desirable level for manufacturing and processing of the fiber glass strands.

The strand integrity of the new G-150 product was also compared to the strand integrity of the existing G-150 product. The strand integrity of the fiber glass products was determined by measuring air drag as set forth below.

Twelve bobbins of the existing G-150 product were tested for strand integrity by measuring air drag. Air drag is used as a measurement of strand integrity, indicating how easy or difficult it is for a given air pressure to open the filament bundle of a strand. The air drag was measured using a Model TE-200 two hundred gram tensiometer, manufactured by Electromatic Equipment Co., Inc. of Cedarhurst, N.Y., and an air jet nozzle from a Model L-5000 loom, manufactured by Sulzer Ruti. Air drag readings were taken by data collection software at different pressures controlled by pressure regulators and solenoid valves. Air was applied to the air jet nozzle and the tension was measured as air drag. The data collection software collected two hundred readings at each pressure setting and calculated the average air drag. Fifteen bobbins of the new G-150 product were also tested for strand integrity using this machine. The air drag of the strand from each bobbin was measured at air pressures of 25, 35, 40, 45, 50, and 55 psi.

Figure 7:
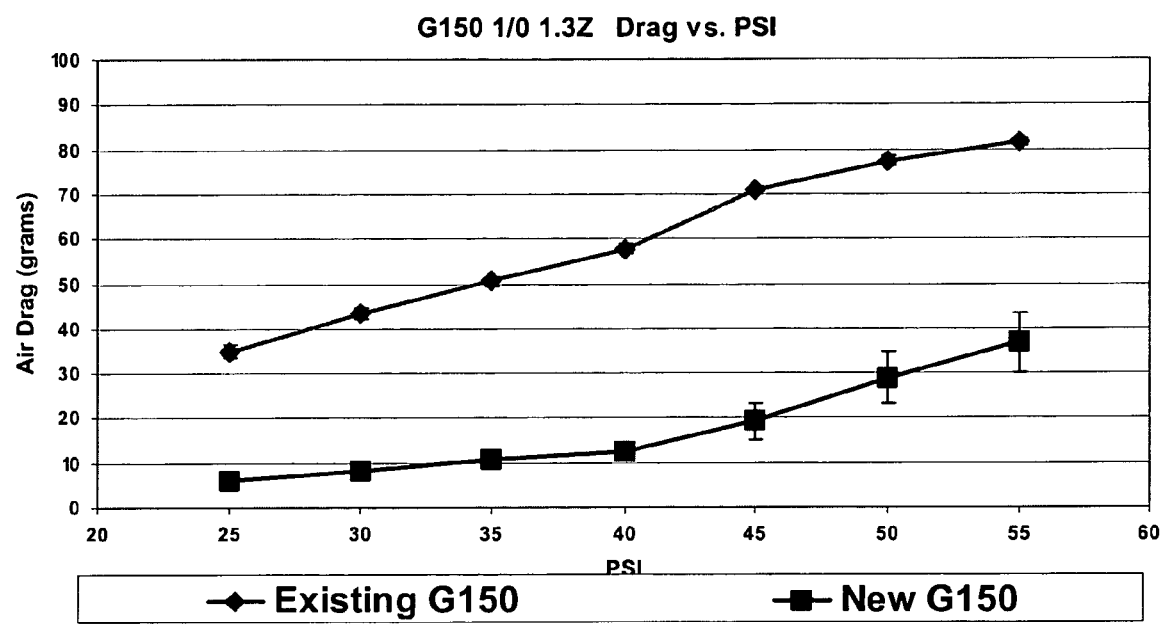
FIG. 7 is a graph comparing the strand integrity of an embodiment of a fiber glass product of the present invention with that of a presently available fiber glass product.

FIG. 7 is a graph that compares the air drag of the new G-150 product to the existing G-150 product. The line data points represent mean values (e.g., the data points for the new G-150 product represent the mean value of the nine bobbins tested at that air pressure) and the error bars represent differences of one standard deviation. As shown in FIG. 7, the air drag (and consequently the strand integrity) of the new G-150 product is considerably lower than the air drag of the existing G-150 product. Thus, the new G-150 product exhibited superior strand integrity.

EXAMPLE 3

The new G-150 product from Example 2 was also compared to a G-150 product coated with the sizing composition shown in Table 6:

TABLE 6

10 gallon Formulation

| Component | Amount | % of Solids |
|---|---|---|
| Hot Water for POLYOX WSR 301 | 4309 grams | 0% |
| POLYOX WSR 301[18] | 22 grams | 1.0% |
| Hot Water for DYNAKOLL SI 100 | 1702 grams | 0% |
| DYNAKOLL SI 100[19] | 1702 grams | 79.0% |
| Hot Water | 10342 grams | 0% |
| Acetic Acid[20] | 86 grams | 0% |
| ALUBRASPIN 227[21] | 259 grams | 6.0% |
| PROTOLUBE HD-A[22] | 383 grams | 4.0% |
| Water for Z-6032 | 27 grams | 0% |
| Z-6032 | 539 | 10.0% |
| Acetic Acid[23] | 48 grams | 0% |
| Water | 2154 grams | 0% |
| Total Solids = | | 100.0% |

[18]POLYOX WSR 301 water-soluble poly(ethylene oxide) lubricant which is commercially available from Union Carbide Corporation.
[19]DYNAKOLL SI 100 chemically modified rosin which was purchased from Eka Chemicals AB, Sweeden.
[20]Generic glacial acetic acid.
[21]ALUBRASPIN 227 silylated polyamine polymer lubricant which was purchased from BASF Corp. of Parsippany, New Jersey.
[22]PROTOLUBE HD-A dispersion of polyethylene particles which is commercially available from Bayer Corporation of Pittsburgh, PA.
[23]Generic glacial acetic acid.

The sizing composition of Table 6 was prepared as follows. POLYOX WSR 301 was added to water in a premix bucket at approximately 160° F. under stirred conditions and then transferred to a main mix tank for subsequent processing. DYNAKOLL SI 100 was then slowly added to water in a premix bucket at approximately 160° F. in a separate vessel and agitated for ten minutes to disperse it. The DYNAKOLL SI 100 dispersion was then transferred to the main mix tank.

ALUBRASPIN 227 was then added slowly to water and acetic acid in a premix bucket with stirring at approximately 160° F. The ALUBRASPIN 227/water/acetic acid was transferred to the main mix tank. The PROTOLUBE HD-A was also added to the main mix tank.

A premix bucket containing the Z-6032 silane was placed in an ice water bath and water was slowly added to the bucket with stirring. The silane and water were stirred for 10 minutes. The bucket was then covered and kept chilled at approximately 50° F. for fiver hours without stirring. A separate mixture of acetic acid and water was prepared in another premix bucket. After chilling for five hours, the silane/water mixture was slowly added to the acetic acid/water mixture with stirring. This mixture was then added to the main mix tank. Cold water was added to the main mix tank to dilute the sizing composition to a final volume of ten (10) gallons. The pH of the sizing composition was adjusted to a pH of 4.0+/−0.2. The main mix tank was agitated for ten minutes.

The sizing composition of Table 6 was applied to glass fibers and wound into bobbins as described in Example 2 above in connection with the new G-150 product. Other than the sizing composition, the new G-150 product and the G-150 product coated with the sizing composition of Table 6 were formed and wound under the same conditions. The G-150 product coated with the sizing composition of Table 6 will be referred to herein as the "Example 3 G-150 product."

Another sizing composition was also prepared. This sizing composition was the same as the sizing composition in Table 6, except this sizing composition did not include any PROTOLUBE HD-A. This sizing composition was prepared in the same manner as the sizing composition of Table 6, and was applied to glass fibers and wound into bobbins as described above in connection with the new G-150 product. The G-150 product coated with the sizing composition of Table 6 without PROTOLUBE HD-A will be referred to herein as the "Example 3 G-150 product without wax."

Figure 8:
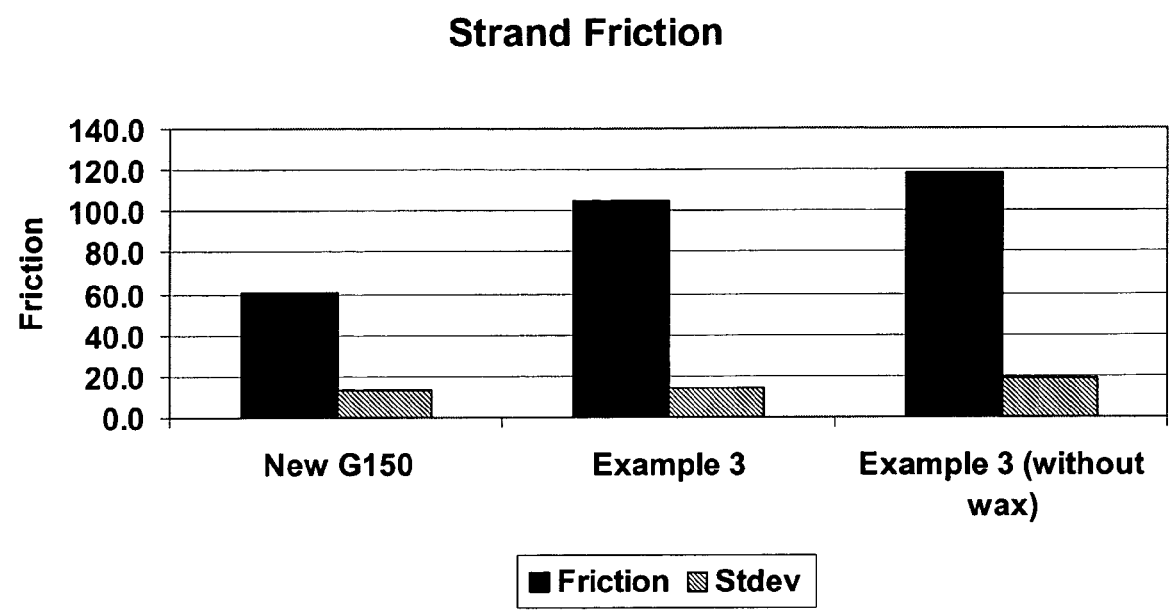
FIG. 8 is a chart comparing the strand friction of an embodiment of a fiber glass product of the present invention with that of a fiber glass product coated with another sizing composition.

The strand frictions of the three products were measured as described above in Example 2. Three bobbins of the Example 3 G-150 product, thirteen bobbins of the Example 3G-150 product without wax, and six bobbins of the new G-150 product were tested for strand friction in accordance with procedure described in Example 2. FIG. 8 is a chart that summarizes the strand friction data. As shown in FIG. 8, the strand friction of the Example 3 G-150 product without wax (~118 grams) was nearly twice that of the new G-150 product (~61 grams), and the strand friction of the Example 3 G-150 product (~105 grams) was also substantially larger than that of the new G-150 product. Thus, the new G-150 product is expected to perform much better in applications where high strand friction is a concern. Such applications can include those with a number of contact points, which can increase the tension on a strand and cause breaks due to the strand friction. Similarly, the new G-150 product would not be expected to perform well in air jet weaving applications.

EXAMPLE 4

The use of aminopropyltriethoxysilane in embodiments of sizing compositions of the present invention is believed to have a desirable effect on strand friction. For comparison, a sizing composition similar to the one set forth in Table 3 was prepared using the same components and amounts, except the amounts of the silanes in the sizing composition were modified as follows: 5.0% of A-174 gamma-methacryloxypropyltrimethoxysilane; 5.0% of A-187 gamma-glycidoxypropyltrimethoxysilane; and 0% of A-1100 gamma-aminopropyltriethoxysilane. This modified sizing composition was applied to glass fibers and wound into bobbins as described in Example 2 above in connection with the new G-150 product. The strand friction was measured as described above in Example 2. The strand friction of the fiber glass product nearly doubled, in comparison to the new G-150 product in Example 2, when aminopropyltriethoxysilane was omitted from the sizing composition. Thus, aminopropyltriethoxysilane is believed to have a desirable effect on strand friction when used in embodiments of sizing compositions of the present invention.

Desirable characteristics, which can be exhibited by the present invention, include, but are not limited to, the provision of sizing compositions that can have improved compatibility a variety of resins; the provision of fiber glass strands coated with a sizing composition that can have improved compatibility with a variety of resins; the provision of sizing compositions that can reduce the number of broken filaments observed during the manufacture of fiber glass strands; the provision of fiber glass strands that can exhibit reduced broken filaments during manufacture; the provision of fiber glass strands that can exhibit reduced broken filaments during downstream processing; the provision of a sizing composition, that upon at least partially coating fiber glass strand, will result in the fiber glass strand exhibiting improved frictional properties; the provision of fiber glass strands that can exhibit improved frictional properties; the provision of fiber glass strands coated with a sizing composition that will pay out more consistently resulting in fewer breakouts; the provision of fiber glass strands coated with a sizing composition that can demonstrate improved resistance to abrasion during manufacture and downstream processing; the provision of fiber glass strands coated with a sizing composition that can exhibit high strand integrity; the provision of sizing compositions that can reduce the costs of manufacturing fiber glass strands; the provision of fiber glass strands coated with a sizing composition that can exhibit adequate tensile strengths; the provision of fiber glass strands coated with a sizing composition that can improve productivity during downstream processing; and others.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

That which is claimed:

1. A fiber glass strand comprising at least one glass fiber at least partially coated with a sizing composition, the sizing composition comprising:
   at least one rosin;
   at least one aminofunctional coupling agent; and
   at least one lubricant,
wherein the fiber glass strand has a strand friction of about 90 grams or less and wherein the fiber glass strand has an air drag of less than about 20 grams at 45 psi.

2. The fiber glass strand of claim 1, wherein the fiber glass strand has a strand friction of about 75 grams or less.

3. The fiber glass strand of claim 1, wherein the fiber glass strand has a strand friction of about 65 grams or less.

4. The fiber glass strand of claim 1, wherein the at least one rosin comprises at least one chemically-modified rosin.

5. The fiber glass strand of claim 4, wherein the at least one chemically-modified rosin is dispersible in water.

6. The fiber glass strand of claim 4, wherein the at least one chemically-modified rosin comprises modified abietic acid.

7. The fiber glass strand of claim 1, wherein the at least one rosin comprises about 50 percent by weight or greater of the sizing composition on a total solids basis.

8. The fiber glass strand of claim 1, wherein the at least one rosin comprises from about 60 to about 90 percent by weight of the sizing composition on a total solids basis.

9. The fiber glass strand of claim 1, wherein the at least one rosin comprises from about 75 to about 85 percent by weight of the sizing composition on a total solids basis.

10. The fiber glass strand of claim 1, wherein the at least one aminofunctional coupling agent comprises at least one aminopropyltrialkoxysilane.

11. The fiber glass strand of claim 10, further comprising a second coupling agent.

12. The fiber glass strand of claim 11, wherein the second coupling agent comprises at least one methacryloxypropyltrialkoxysilane.

13. The fiber glass strand of claim 12, further comprising a third coupling agent.

14. The fiber glass strand of claim 13, wherein the third coupling agent comprises at least one glycidoxypropyltrialkoxysilane.

15. The fiber glass strand of claim 14, wherein the at least one aminopropyltrialkoxysilane comprises up to about 10 weight percent of the sizing composition on a total solids basis, wherein the at least one glycidoxypropyltrialkoxysilane comprises up to about 10 weight percent of the sizing composition on a total solids basis, and wherein the at least one methacryloxypropyltrialkoxysilane comprises up to about 10 weight percent of the sizing composition on a total solids basis.

16. The fiber glass strand of claim 14, wherein the at least one aminopropyltrialkoxysilane comprises up to about 5 weight percent of the sizing composition on a total solids basis, wherein the at least one glycidoxypropyltrialkoxysilane comprises up to about 5 weight percent of the sizing composition on a total solids basis, and wherein the at least one methacryloxypropyltrialkoxysilane comprises up to about 5 weight percent of the sizing composition on a total solids basis.

17. The fiber glass strand of claim 1, further comprising a second coupling agent.

18. The fiber glass strand of claim 17, wherein the second coupling agent comprises at least one glycidoxypropyltrialkoxysilane or at least one methacryloxypropyltrialkoxysilane.

19. The fiber glass strand of claim 17, further comprising a third coupling agent.

20. The fiber glass strand of claim 19, wherein the second coupling agent comprises at least one glycidoxypropyltrialkoxysilane and the third coupling agent comprises at least one methacryloxypropyltrialkoxysilane.

21. The fiber glass strand of claim 1, wherein the at least one lubricant comprises at least one cationic lubricant.

22. The fiber glass strand of claim 21, wherein the cationic lubricant comprises up to about 10 weight percent of the sizing composition based on total solids.

23. The fiber glass strand of claim 21, wherein the at least one lubricant further comprises at least one nonionic lubricant.

24. The fiber glass strand of claim 23, wherein the at least one nonionic lubricant comprises at least one wax.

25. The fiber glass strand of claim 23, wherein the at least one nonionic lubricant comprises at least one polyethylene wax.

26. The fiber glass strand of claim 23, wherein the at least one nonionic lubricant comprises at least one paraffin wax.

27. The fiber glass strand of claim 23, wherein the at least one nonionic lubricant comprises at least one oil.

28. The fiber glass strand of claim 23, wherein the at least one nonionic lubricant comprises up to about 10 weight percent of the sizing composition based on total solids.

29. The fiber glass strand of claim 1, wherein the at least one lubricant comprises at least one nonionic lubricant.

30. The fiber glass strand of claim 29, wherein the at least one nonionic lubricant comprises at least one wax.

31. The fiber glass strand of claim 29, wherein the at least one nonionic lubricant comprises at least one polyethylene wax.

32. The fiber glass strand of claim 29, wherein the at least one nonionic lubricant comprises at least one paraffin wax.

33. The fiber glass strand of claim 29, wherein the at least one nonionic lubricant comprises at least one oil.

34. The fiber glass strand of claim 29, wherein the at least one nonionic lubricant comprises up to about 30 weight percent of the sizing composition based on total solids.

35. The fiber glass strand of claim 1, wherein the sizing composition further comprises at least one biocide.

36. The fiber glass strand of claim 1, wherein the sizing composition further comprises at least one of antistatic agents, anti-foaming agents, wetting agents, and mixtures thereof.

37. A screen comprising at least one fiber glass strand according to claim 1.

38. A tape comprising at least one fiber glass strand according to claim 1.

39. A flooring product comprising at least one fiber glass strand according to claim 1.

40. An aerospace composite comprising at least one fiber glass strand according to claim 1.

41. An aviation composite comprising at least one fiber glass strand according to claim 1.

42. A filter comprising at least one fiber glass strand according to claim 1.

43. An aqueous sizing composition for at least partially coating glass fibers, comprising:
- at least one rosin;
- at least one aminofunctional coupling agent; and
- at least one lubricant, wherein the sizing composition is adapted to provide a fiber glass strand, at least partially coated with the sizing composition, with a strand friction of about 90 grams or less and an air drag of less than about 20 grams at 45 psi.

44. The aqueous sizing composition of claim 43, wherein the sizing composition is adapted to provide the fiber glass strand, at least partially coated with the sizing composition, with a strand friction of about 75 grams or less.

45. The aqueous sizing composition of claim 43, wherein the sizing composition is adapted to provide the fiber glass strand, at least partially coated with the sizing composition, with a strand friction of about 65 grams or less.

46. An aqueous sizing composition for at least partially coating glass fibers as part of a fiber glass strand, comprising:
- at least one rosin in an amount up to about 90 weight percent on a total solids basis;
- a first coupling agent in an amount up to about 5 weight percent on a total solids basis, the first coupling agent comprising at least one aminopropyltrialkoxysilane;
- a second coupling agent in an amount up to about 5 weight percent on a total solids basis, the second coupling agent comprising at least one glycidoxypropyltrialkoxysilane;
- a third coupling agent in an amount up to about 5 weight percent on a total solids basis, the third coupling agent comprising at least one methacyloxypropyltrialkoxysilane;
- a cationic lubricant in an amount up to about 10 weight percent on a total solids basis; and
- a nonionic lubricant in an amount up to about 10 weight percent on a total solids basis, wherein the sizing composition is adapted to provide the fiber glass strand an air drag of less than about 20 grams at 45 psi.

47. A fiber glass strand comprising at least one glass fiber at least partially coated with a sizing composition, the sizing composition comprising:
- at least one rosin in an amount up to about 90 weight percent on a total solids basis;
- a first coupling agent in an amount up to about 5 weight percent on a total solids basis, the first coupling agent comprising at least one aminopropyltrialkoxysilane;
- a second coupling agent in an amount up to about 5 weight percent on a total solids basis, the second coupling agent comprising at least one glycidoxypropyltrialkoxysilane;
- a third coupling agent in an amount up to about 5 weight percent on a total solids basis, the third coupling agent comprising at least one methacyloxypropyltrialkoxysilane;
- a cationic lubricant in an amount up to about 10 weight percent on a total solids basis; and
- a nonionic lubricant in an amount up to about 10 weight percent on a total solids basis, wherein the fiber glass strand has an air drag of less than about 20 grams at 45 psi.

48. A fiber glass strand comprising at least one glass fiber at least partially coated with a sizing composition, the sizing composition comprising:
- at least one rosin;
- at least one aminofunctional coupling agent; and
- at least one lubricant, wherein the fiber glass strand has an air drag of less than about 20 grams at 45 psi.

49. An aqueous sizing composition for at least partially coating glass fibers, comprising:
- at least one rosin;
- at least one aminofunctional coupling agent; and
- at least one lubricant, wherein the sizing composition is adapted to provide a fiber glass strand, at least partially coated with the sizing composition, with an air drag of less than about 20 grams at 45 psi.

50. A fiber glass strand comprising at least one glass fiber at least partially coated with a sizing composition, the sizing composition consisting essentially of:
- at least one rosin;
- at least one aminofunctional coupling agent; and
- at least one lubricant, wherein the fiber glass strand has a strand friction of about 90 grams or less.

* * * * *